United States Patent [19]

Baes

[11] Patent Number: 4,840,672

[45] Date of Patent: Jun. 20, 1989

[54] LIGHTWEIGHT INSULATING BOARDS AND PROCESS FOR MANUFACTURING SAME

[75] Inventor: Emile Baes, Kapelle-op-den-Bos, Belgium

[73] Assignee: Redco N.V., Belgium

[21] Appl. No.: 25,195

[22] Filed: Mar. 12, 1987

[30] Foreign Application Priority Data

Mar. 14, 1986 [DE] Fed. Rep. of Germany ....... 3608544

[51] Int. Cl.$^4$ ............................ C08K 3/34; C08K 3/10
[52] U.S. Cl. ........................................ 106/86; 106/93; 106/97; 106/99; 106/18; 524/2; 524/4; 524/5; 524/449; 524/436; 523/218
[58] Field of Search ............................ 524/4, 2, 5, 295; 106/93, 86, 99; 523/218

[56] References Cited

U.S. PATENT DOCUMENTS

| | | | |
|---|---|---|---|
| 2,733,995 | 2/1956 | Robinson | 524/5 |
| 3,502,490 | 3/1970 | Ware | 524/5 |
| 3,933,515 | 1/1976 | Yang | 106/99 |
| 3,953,565 | 4/1976 | Mizutani et al. | 524/5 |
| 4,094,829 | 8/1978 | Steering | 524/650 |
| 4,101,335 | 7/1978 | Barrable | 106/119 |
| 4,174,230 | 11/1979 | Hashimoto et al. | 106/111 |
| 4,373,992 | 2/1983 | Bonelac | 428/281 |
| 4,443,562 | 4/1984 | Mazer | 524/2 |
| 4,455,171 | 6/1984 | Spensley et al. | 108/315 |

FOREIGN PATENT DOCUMENTS

| | | | |
|---|---|---|---|
| 41931 | 4/1979 | Japan | 524/4 |
| 11863 | 1/1982 | Japan | 524/5 |
| 61649 | 4/1982 | Japan | 524/5 |
| 8653 | 1/1984 | Japan | 524/5 |
| 146960 | 8/1984 | Japan | 524/5 |
| 1026544 | 2/1986 | Japan | 524/5 |
| 1031337 | 2/1986 | Japan | 524/4 |
| 612659 | 8/1979 | Switzerland | 524/4 |
| 579254 | 11/1977 | U.S.S.R. | 524/5 |
| 1225755 | 3/1971 | United Kingdom | 524/5 |
| 1498966 | 1/1978 | United Kingdom . | |
| 20862641 | 3/1982 | United Kingdom . | |
| 2131843A | 6/1984 | United Kingdom | 524/4 |

*Primary Examiner*—John C. Bleutge
*Assistant Examiner*—David W. Woodward
*Attorney, Agent, or Firm*—Wegner & Bretschneider

[57] ABSTRACT

Lightweight insulating boards in accordance with the present invention comprise Portland cement, fibers and fillers including:

(a) 50–75% by weight of cement,
(b) 0–5% by weight of cellulose fibers,
(c) 0.5–4% by weight of alkali-resistant fiber material,
(d) 5–20% by weight of mica,
(e) 5–20% by weight of light filler and
(f) 8–25% by weight of hydrated lime.

They are shaped into boards from a suspension and are set at least 15 days, and preferably 28 days. The insulating boards of the present invention meet all of the requirements set for such materials regarding flexural strength, incombustibility, and the like.

11 Claims, No Drawings

LIGHTWEIGHT INSULATING BOARDS AND PROCESS FOR MANUFACTURING SAME

TECHNICAL FIELD OF THE INVENTION

The present invention is directed to lightweight insulating boards and a process for manufacturing same, with Portland cement, fibers and fillers, the boards being free from asbestos.

BACKGROUND OF THE INVENTION

It is known to produce lightweight insulating boards from an aqueous suspension of hydraulically setting binders containing calcium silicate, a reinforcing fiber material and fillers which harden either in air, under normal conditions, or under steam pressure. In said procedure it is necessary that the components of the binder, namely calcium silicates or hydrated lime, react with silica and water to form the known calcium silicate hydrate structures. The structure of the set binder will depend on the relative proportions of hydrated lime and silica which are capable of actually reacting under the reaction conditions. The properties of the product further depend, to a significant extent, on the reinforcing fiber material which is added into the aqueous suspension. Asbestos had proven to be useful for this purpose. However, it has recently become necessary to abstain from using asbestos fibers for reasons of environmental protection.

In the meantime, a great many so-called asbestos-free products have been developed and marketed. However, these products generally have significant drawbacks over the asbestos-containing products, since certain desired properties can only be achieved at the expense of other desired properties. This, accordingly, limits the general usefulness of the asbestos-free products, as compared to that of the asbestos-containing products.

One typical field of application for asbestos fibers is lightweight insulating boards, more specifically, those having high fire-resistance. It has been shown that lightweight insulating boards can be manufactured by replacing the asbestos fibers with cellulose fibers and/or organic fibers and/or alkali-resistant glass fibers. However, these products generally have inferior mechanical properties and are less flame-resistant. They further fail to meet the requirements of the toxicity test according to DIN 53436, since poisonous gases may be formed therefrom at high temperatures.

As a filler for flame-resistant insulating boards, mica has proven valuable; mica, if desired, has been employed together with light fillers, expanded perlites or puffed clay; cf. the British Patent Specification No. 1,498,966. In said Patent Specification there have been mentioned, as binders, hydraulically setting calcium silicate binders, Portland cement, alumina cement and blast furnace slag cement. Thus, the binders used are hydraulic binders which will only set under autoclave conditions or binders setting with water at normal temperature.

It is known that binders setting at room temperature have mechanically inferior properties, more specifically, a poorer flexural strength, and an inferior water resistance than the binders having been hardened in an autoclave.

Thus, in practice asbestos-free, flame-resistant lightweight insulating boards were prepared from products hardened in an autoclave in which, more particularly, tobermorite structures have been formed. Thus, these crystalline calcium silicate structures so far have been considered the indispensable prerequisite to obtain products which are thermally stable as well as capable of sustaining mechanical load.

However, the required setting in an autoclave exhibits considerable disadvantages:

1. Hardening in an autoclave is very energy-consuming and may even cost more than 10% of the employed raw material cost. For the reinforcing fiber material, only cellulose and a few very expensive organic fibers can be used, as under the autoclave temperatures and alkaline conditions, glass fibers, as well as most organic fibers, are destroyed.

2. Under the conditions of autoclaving, the crystalline tobermorite structure can be formed only if free crystalline silicon dioxide, e.g. quartz, is present. Even under ideal conditions, a certain amount of unreacted silicon dioxide remains in the final product. However, since quartz dust is dangerous to human health, official regulations require that only minimum amounts of crystalline quartz be present in the final product. However, when other silicon dioxide sources, e.g. amorphous silica, fly ash etc., are used, the thermal stability of the final products at high temperatures significantly decreases.

SUMMARY OF THE PRESENT INVENTION

Accordingly, it is the object of the present invention to develop lightweight insulating boards comprising a Portland cement, fibers and fillers, the boards being free from asbestos and any free crystalline silicon dioxide in the final product, and having been already hydraulically set at normal temperatures, i.e. which need not be hardened in an autoclave with using superheated steam. Moreover, the products are to conform to mechanical, flame resistance and toxicity national standards. Finally, with respect to the cost of raw materials and processing, the new products are to be so economical that they are able to compete with the products already present in the market. As a result of intense and expensive investigations it has been found that this object can be attained in a surprisingly simple way by using the components Portland cement, fibers and fillers in well defined, mutually adjusted, amounts and with the addition, from 8 to 25% by weight, and preferably from 10 to 18% by weight, of hydrated lime.

DETAILED DESCRIPTION OF THE PREFERRED EMBODIMENTS

The present invention is directed to lightweight insulating boards comprising a Portland cement, fibers and fillers, which comprise:
(a) 50-75% by weight of cement,
(b) 0-5% by weight of cellulose fibers,
(c) 0.5-4% by weight of alkali-resistant fiber material,
(d) 5-20% by weight of mica,
(e) 5-20% by weight of light filler and
(f) 8-25% by weight of hydrated lime.

Particularly good results are accomplished, if the insulating boards include:
(a) 55-65% by weight of hydraulically set Portland cement,
(b) 2-4% by weight of cellulose fibers,
(c) 0.8-1.5% by weight of alkali-resistant fiber material,
(d) 10-15% by weight of mica,
(e) 8-18% by weight of light filler and (f) 10–18% by weight of hydrated lime.

As the alkali-resistant fiber material, preferably polyvinylalcohol (PVA), polyacrylonitrile (PAN) and polyamides may be used, in an amount of from 0.8 to 2% by weight, or glass fibers having been coated so as to be alkali-resistant, in an amount of from 1 to 4% by weight, and mixtures thereof, are used.

As the light fillers, more specifically, expanded perlites, puffed clay, spherical xonotlite aggregates and ground foam concrete or mixtures thereof have proven to be useful.

The process for producing the insulating boards according to the present invention is carried out by compounding in an excess amount of water:

(a) 50–75% by weight, and preferably 55–65% by weight, of cement,
(b) 0–5% by weight, and preferably 2–4% by weight, of cellulose fibers,
(c) 0.5–4% by weight, and preferably 0.8–1.5% by weight, of alkali-resistant fiber material,
(d) 5–20% by weight, and preferably 10–15% by weight, of mica,
(e) 5–20% by weight, and preferably 8–18% by weight, of light filler and
(f) 8–25% by weight, and preferably 10–18% by weight, of hydrated lime, separating the superfluous water from the suspension in a known manner while shaping into boards, and allowing the mixture to set in a humid atmosphere for at least 15 days, and preferably for 28 days.

Shaping the suspension into boards and the separation of the superfluous water from the suspension are effected in a known manner on filter presses, Hatschek machines, machines according to Magnani, Fourdrinier or the so-called cast and winding machines. The diluted suspensions generally contain 1 part of solids per 5 to 25 parts of water. After being shaped, the products are cut to have the desired formats and are stored in a humid atmosphere until they will have sufficiently set and sufficiently been hardened, generally for at least 15 days, and preferably 28 days.

For carrying out said process, a slurry of the fiber material is prepared to which the fillers, the hydrated lime and the cement are then added. Of course conventional flocculating agents etc. can be added to the suspension.

The products according to the present invention have the customary density, namely from 0.7 to 1.1 g/cm$_3$, and preferably from 0.8 to 1.0 g/cm$_3$. The amount of fiber material used depends on the demanded flexural strength. However, the cellulose fiber content should be kept as low as possible, since higher amounts of cellulose fibers will result in a deteriorated combustion property. Higher contents of alkali-resistant organic fibers, although they enhance the flexural strength, also deteriorate the behavior of the material in the flammability test.

Glass fibers made alkali-resistant by means of a coating have to be added in somewhat higher amounts in order to attain the same amount of flexural strength. Since the products according to the invention mostly will not be subjected to a permanent strain by moisture, the long-term stability of the products is insured, even if they contain larger amounts of glass fibers made alkali-resistant by means of a coating.

The mica employed as filler can be used in commercially available grades, however, particularly good results are achieved, if at least 60% have a grain size of less than 250 μm. The proportion of particles larger than 500 μm in size should be below 3%, since otherwise trouble may occur in the manufacturing process.

The use of hydrated lime in the present invention provides unexpectedly good results. Comparative tests of boards without any hydrated lime or with added amounts of hydrated lime of less than 8% by weight, showed that the boards could not meet the requirements of the Official Standards, such as the incombustibility test according to the "British Standards", BS 476, part 4. Furthermore, such products have a higher percent shrinkage at 950° C.

At a hydrated lime content of more than 25% by weight, the mechanical properties of the boards begin to decrease and the products do not have the demanded mechanical and flexural strength. Hence, it is preferred to add amounts of from 10 to 18% hydrated lime by weight. The ratio of cement to hydrated lime, thus, is within the range of from 3:1 to 9:1, and preferably approximately within the range of from 4:1 to 5:1.

The ratio of the flake fillers (mica) to the globular fillers (light fillers) is preferred within the range of from 1:1 to 1:1.5. The total amount of fillers is in the range between 10 and 40% by weight, and preferably in the range between 20 and 30% by weight.

For the cellulose fibers, any of the fibers conventionally employed for such purposes can be used, more particularly those obtained from flax, hemp, sisal, eucalyptus and those obtained from wood, more specifically products recovered from coniferous trees, which are also used in the paper industry. In the process according to the invention, substantially less cellulose fibers are used than are in conventional products. In an extreme case, it will even be possible not to use any cellulose fibers at all.

Of course, the products according to the invention can be mixed with the conventional additives such as pigments, filtration aids, flocculating gents, emulsifiers etc. and certain amounts of comminuted waste materials such as calcium silicates and aluminum silicates. However, by no means are any crystalline silicon dioxides to be added, since the latter, in spite of the excess amount of hydrated lime, would not be reacted to form calcium silicates at room temperature and, therefore, would result in an inadmissibly high content of crystalline silicon dioxide in the final product.

In the subsequent Examples typical embodiments and the process for preparing same are illustrated in greater detail.

EXAMPLE 1

3 parts by weight of cellulose and 1 part by weight of PVA were suspended in water. Then, 12 parts by weight of mica, 15 parts by weight of hydrated lime, 11 parts by weight of expanded perlite and 58 parts by weight of Portland cement were added in sequence. The suspension contained, based on the total solids content, the 25-fold amount of water. The suspension was processed on a Hatschek machine to form boards which, depending on the process conditions were from 8 and 25 mm in thickness. The boards were cut and stored in a humid atmosphere for 28 days. Lightweight insulating boards had been formed, which met all of the requirements with respect to flexural strength, thermal shrinkage at 950° C., incombustibility test BS 476, part 4, and toxicity test according to DIN 53436 and, after drying and having been re-moistened, exhibited an elongation and shrinkage, respectively, of less than 2 mm/m.

EXAMPLE 2

Example 1 was repeated using a mixture comprising 4 parts by weight of cellulose, 1 part by weight of PVA, 12 parts by weight of mica, 15 parts by weight of hydrated lime, 10 parts by weight of perlite and 58 parts by weight of cement. The product had a slightly improved flexural strength, a lower thermal shrinkage at 950° C. and comparable values of the shrinkage and re-elongation when dried and re-moistened.

EXAMPLE 3

Example 1 was repeated using a mixture comprising 2 parts by weight of cellulose, 1 part by weight of PVA, 15 parts by weight of mica, 10 parts by weight of hydrated lime, 15 parts by weight of puffed perlite and 57 parts by weight of cement. The obtained product also met all of the requirements as set.

COMPARATIVE EXAMPLE

Example 1 was repeated using a mixture comprising 4 parts by weight of cellulose, 1 part by weight of PVA, 12 parts by weight of mica, 15 parts by weight of perlite and 68 parts by weight of cement. The thus obtained product had a distinctly higher shrinkage at 950° C. and did not satisfy the conditions of the incombustibility test according to BS 476, part 4.

I claim:
1. Lightweight insulating board comprising:
   (a) 50-70% by weight of cement,
   (b) 0-5% by weight of cellulose fibers,
   (c) 0.5-4% by weight of non-cellulose, alkali-resistant fiber material,
   (d) 5-20% by weight of mica,
   (e) 5-20% by weight of light filler and
   (f) 8-25% by weight of hydrated lime.
2. Insulating board according to claim 1 comprising:
   (a) 55-65% by weight of cement,
   (b) 2-4% by weight of cellulose fibers,
   (c) 0.8-1.5% by weight of non-cellulose, alkali-resistant fiber material,
   (d) 10-15% by weight of mica,
   (e) 8-18% by weight of light filler, and
   (f) 10-18% by weight of hydrated lime.
3. Insulating board according to claim 1 wherein said non-cellulose, alkali-resistant fiber material comprises 0.8 to 2.0% by weight of polyvinylalcohol (PVA), polyacrylonitrile (PAN) or polyamides, or from 1 to 4% by weight of glass fibers coated so as to be alkali-resistant or mixtures thereof, based on the total weight of the insulating board.
4. Insulating board according to claim 2 wherein said alkali-resistant fiber material comprises 0.8 to 2.0% by weight of polyvinylalcohol (PVA), polyacrylonitrile (PAN) or polyamides, or from 1 to 4% by weight of glass fibers coated so as to be alkali-resistant, or mixtures thereof, based on the total weight of the insulating board.
5. Insulating board according to claim 1 wherein said light fillers comprise expanded perlites, puffed clay, synthetic spherical xonotlite aggregates or ground foam concrete, or mixtures thereof.
6. Insulating board according to claim 2 wherein said light fillers comprise expanded erlites, puffed clay, synthetic spherical xonotlite aggregates or ground foam concrete, or mixtures thereof.
7. Insulating board according to claim 3 wherein in said light fillers comprise expanded perlites, puffed clay, synthetic spherical xonotlite aggregates or ground foam concrete, or mixtures thereof.
8. A process for producing a lightweight insulating board comprising:
   compounding in an excess of water: 50-75% by weight of cement, 0-5% by weight of cellulose fibers, 0.5-4% by weight non-cellulose, alkali-resistant fiber material, 5-20% by weight of mica, 5-20% by weight of light filler and 8-25% by weight of hydrated lime to produce a suspension;
   separating superfluous water from the suspension while shaping into a board; and
   setting the board in a humid atmosphere for at least 15 days.
9. The process according to claim 8, wherein said non-cellulose, alkali-resistant fiber material is from 0 8 to 2.0% by weight of polyvinylalcohol (PVA), polyacrylonitrile (PAN) or polyamides, or from 1 to 4% by weight of glass fibers coated such as to be alkali-resistant, or mixtures thereof, based on the total weight of the insulating board.
10. The process according to claim 8, wherein said light fillers comprise expanded perlites, puffed clay, synthetic spherical xonotlite aggregates or ground foam concrete, or mixtures thereof.
11. The process according to claim 9, wherein said light fillers comprise expanded perlites, puffed clay, synthetic spherical xonotlite aggregates or ground foam concrete, or mixtures thereof.

* * * * *